(No Model.)

E. JACOBI.
LUBRICATOR.

No. 555,246. Patented Feb. 25, 1896.

Witnesses.

Inventor.
Emil Jacobi
Attorney.

UNITED STATES PATENT OFFICE.

EMIL JACOBI, OF PHILADELPHIA, PENNSYLVANIA.

LUBRICATOR.

SPECIFICATION forming part of Letters Patent No. 555,246, dated February 25, 1896.

Application filed August 29, 1895. Serial No. 560,849. (No model.)

*To all whom it may concern:*

Be it known that I, EMIL JACOBI, of the city and county of Philadelphia and State of Pennsylvania, have invented an Improvement in Lubricating Devices for Rotating Wheels, &c., of which the following is a specification.

My invention has reference to lubricating devices for rotating wheels, &c.; and it consists of certain improvements which are fully set forth in the following specification and are shown in the accompanying drawings.

My invention particularly relates to that class of lubricating devices in which the lubricating-vessel is carried by the hub or journal and centrifugal force is utilized to feed the lubricant to the bearings, and embraces certain improvements designed to force the oil into the bearings to be lubricated and prevent it being forced back by centrifugal force, the flow of oil through the lubricator regulating itself with the speed and stopping when in repose. In carrying out this part of my invention I employ a centrifugally-operated piston or movable piece composed of substances having a specific gravity slightly in excess of the specific gravity of the lubricant located in the vessel which contains the oil, and adapted to be forced outward by centrifugal force to put just sufficient pressure upon the oil to prevent it being driven back by the centrifugal force in the passage-way leading from the top of the oil-vessel to the bearings to be lubricated.

My invention also embraces improvements in construction and combination of parts designed to simplify the construction and to enable the parts to be easily put together and applied.

I shall now refer to the accompanying drawings for the purpose of more particularly describing my invention.

Figure 1:
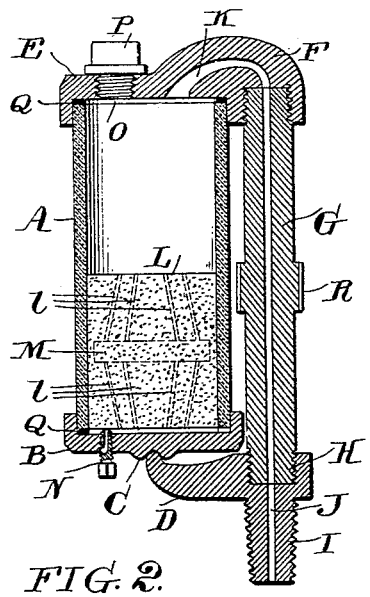
Figure 2:
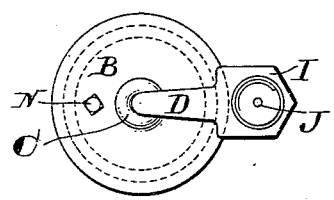
Figure 3:
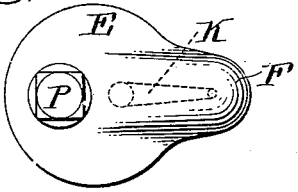

Figure 1 is a longitudinal vertical sectional view of my improved lubricating device. Fig. 2 is an inverted end view, and Fig. 3 is a top view of the same.

A is a hollow tubular piece, preferably cylindrical, and composed of glass to permit the oil contained within it to be seen.

B is a base-cap closing the lower part of the tube A and provided with a recess or bearing C, which is adapted to receive a supporting arm or lug D.

E is the top cap fitting upon and closing the top of the tube A and having an arm extension or neck F threaded to receive the threaded end of a small tube G, the lower end of which is also threaded to engage the threaded socket H of the nipple I. The nipple I carries the arm or lug D. The nipple I is screwed into the hub or journal of the wheel or pulley and is formed with a passage-way J through which the oil may pass to the bearings.

K is a passage-way leading through the top of the cap E and neck or extension F to the passage-way in the tubular piece G.

When the device rotates, the oil contained in the receptacle A is thrown toward the outer end by centrifugal force, and passes through the passage K, tube G, and passage J, to the bearings to be lubricated. While the centrifugal force acts to feed the oil from the vessel A to the supply-passages and tube G, it also acts to some extent to prevent the oil from passing down the tube G and passage J to the bearings. To overcome this tendency of the centrifugal force acting in the tube G, I employ a device in the vessel A which is controlled by centrifugal force and acts by its greater specific gravity to put a pressure upon the oil in the tube G and the passages J K, opposed to the centrifugal force therein, so that tendency of the oil to be thrown back will be counteracted.

As shown, this device for putting pressure on the oil consists of a block L located in the vessel A and acting like a piston therein. Normally this block is located adjacent to the inner end of the vessel A with the oil above it, and when the vessel rotates it is thrown forward by centrifugal force, tending to urge the oil forward through the passage K into the tube G and putting a pressure upon the oil opposed to the centrifugal force in the tube G. As the action of the piston or block L is based on the differential centrifugal force of different specific gravities, I construct the piston of material which has a specific gravity slightly in excess of the specific gravity of the oil and just sufficient to force the oil down in the passage-way back against its own centrifugal force. By adjusting an air-vent N in the cup E the admission of air behind the piston M may be varied, so that the action of the piston N and the flow of oil may be regulated to a nicety. By this construction I am enabled to have a comparatively large and entirely free passage-way for the oil, so that there will be little danger of the passage-way becoming closed or clogged by thickness or impurities in the oil, and the use of adjusting devices to regulate the flow of the oil by contracting or enlarging the passage-way becomes unnecessary.

It will be observed that under the rotary action the lubricator operates automatically to increase the tendency of the oil to flow proportionally to the speed and work to be done, and to arrest all flow of lubricant when rotation ceases.

The block L may be constructed of suitable material. I find it advantageous to employ a block of sulphur, as that possesses approximately the best specific gravity to give the desired results.

The sulphur may be suitably molded and given form and solidity by wires $l\ l$, as shown in dotted lines. A rubber ring or disk M embedded in the block also serves to give form to it and to press its sides outward to maintain frictional piston-like contact with the inner walls of the vessel A.

N is an adjustable air-vent in the cap B to admit air below the piston-block L.

O is an opening in the top cap E, closed by a plug P, through which the oil may be supplied to the vessel A above the block L.

Q Q are packing-rings between the ends of the vessel A and the faces of the caps B and E.

To enable the device to be easily applied to the wheel or pulley hub and to permit the parts to be disconnected, the threaded end of the tube may be provided with right and left hand threads.

The nipple I may be screwed into the pulley-hub and the parts assembled together. The turning of the tube G will screw its ends simultaneously into the nipple I and cap-extension F and clamp the caps B and E upon the vessel A.

The tube G may be provided with a knurled ring or nut R to enable it to be easily turned.

It is also an advantage of this construction that the lubricator can be applied in a limited space, as between spokes of a wheel, owing to the fact that the parts D and F extend out laterally, so that the body of the lubricator may occupy a position outside of the plane of the wheel-spokes.

While the cylinder A of glass permits the oil in the lubricator to be seen, it possesses the further advantage of preventing the movable block or piston L from sticking in the cylinder, which would be liable to occur if a metal cylinder were used, owing to the action of the acids contained in the oil upon the metal walls.

The details of construction shown may be varied without departing from the invention.

What I claim as new, and desire to secure by Letters Patent, is—

1. A lubricating device adapted for attachment to a rotary part, consisting of a vessel to contain oil, a passage-way leading therefrom to the part to be lubricated, and a movable piece or piston located in the vessel and composed of a substance having a specific gravity slightly in excess of the oil, substantially as and for the purposes described.

2. A lubricating device adapted for attachment to a rotary part, consisting of a vessel to contain oil, a passage-way leading therefrom to the part to be lubricated, and a movable piece or piston located in the vessel and composed of a substance having a specific gravity slightly in excess of the oil, and an adjustable air-vent in the base of the vessel below the movable piece or piston, substantially as and for the purposes described.

3. A lubricating device adapted to be attached to a rotating part consisting of a vessel to contain oil, a passage-way leading therefrom to the part to be lubricated and a movable piece located in the vessel and adapted to be moved by centrifugal force when the device is rotated to act upon the oil in the vessel and force it through the passage-way leading therefrom, said movable piece consisting of a piston-like block of composition having a specific gravity slightly in excess of that of the oil and having a ring or disk of rubber embedded in it.

4. A lubricating device adapted to be attached to a rotary part consisting of a vessel to contain oil, a passage-way leading therefrom to the part to be lubricated and a movable piece located in the vessel and adapted to be moved by centrifugal force when the device is rotated to act upon the oil in the vessel and force it through the passage-way leading therefrom, said movable piece consisting of a piston-like block of sulphur molded on a suitable frame.

5. The lubricating device adapted for attachment to a rotating part, consisting of an oil-cup composed of glass, a passage-way leading therefrom to the part to be lubricated, and a movable piece or piston located in the glass oil-cup and composed of substance having a specific gravity slightly in excess of the oil, substantially as and for the purposes described.

6. The combination with the oil-vessel A closed at the top by a cap provided with a passage-way, a part adapted to be connected with the rotary object to be lubricated, supporting the closed bottom of the vessel A, and provided with a passage-way, and a tubular piece connecting the top cap and part to be attached to the object.

7. The combination with the oil-vessel A closed at the top by a cap provided with a passage-way, a part adapted to be connected with the rotary object to be lubricated, supporting the closed bottom of the vessel A, and provided with a passage-way, and a tubular piece connecting the top cap and part to be attached to the object, and a movable centrifugally-actuated piston in the closed oil-vessel.

8. The combination with the oil-vessel A, the cap E therefor provided with a passage-way, a perforated part adapted to be attached to the rotary object to be lubricated and supporting the vessel A, and the tube G having right and left hand threaded extremities adapted to threaded sockets in the top cap and perforated part adapted for attachment to the object to be lubricated.

9. The combination with the closed vessel A to contain oil, a part adapted for attachment to the object to be lubricated provided with a passage-way and having a projection D to support the closed bottom of the vessel A and a tubular part provided with a passage-way leading from the top of the closed vessel A to the attaching part.

10. The combination with the vessel A, the removable top cap E having the neck F and the passage-way K leading through the cap and neck, the bottom cap B, the nipple I adapted for attachment to the object to be lubricated, having the passage-way J and the arm D engaging the cap B, and the tube G between the cap F and the nipple I.

11. The combination with the vessel A, the removable top cap E having the neck F and the passage-way K leading through the cap and neck, the bottom cap B, the nipple I adapted for attachment to the object to be lubricated, having the passage-way J and the arm D engaging the cap B, the movable centrifugally-operated piston in the vessel A, and the tube G between the cap F and the nipple I.

In testimony of which invention I hereunto set my hand.

EMIL JACOBI.

Witnesses:
ARTHUR BOSWELL,
WM. L. EVANS.